United States Patent [19]
Grunert et al.
[11] Patent Number: 5,005,104
[45] Date of Patent: Apr. 2, 1991

[54] CLIP-CONNECTED TERMINAL CONDUCTOR ASSEMBLY

[75] Inventors: Kurt A. Grunert, Beaver, Pa.; Delfin Pabon, Carolina, Puerto Rico; Ronald A. Cheski, Stowe Township, Pa.

[73] Assignee: Westinghouse Electric Corp., Pittsburgh, Pa.

[21] Appl. No.: 568,375

[22] Filed: Aug. 16, 1990

[51] Int. Cl.[5] .................... H02B 1/20

[52] U.S. Cl. .................... 361/355; 335/202; 361/353; 361/363; 361/375; 439/810; 439/814

[58] Field of Search .................... 200/153 G; 335/8, 132, 335/202; 337/45; 361/346, 347, 350, 353-361, 363, 375, 376, 426; 439/810-814

[56] References Cited

U.S. PATENT DOCUMENTS 3,891,298 6/1975 Yorgin .................... 339/272 R
4,603,376 7/1986 Maier .................... 361/426
4,809,132 2/1989 Palmieri et al. .................... 361/353

*Primary Examiner*—Gregory D. Thompson
*Attorney, Agent, or Firm*—C. M. Lorin

[57] ABSTRACT

A clip-connected terminal conductor uses a terminal lug for tightening together with a screw the line cable and the conductor end. A channel is provided in the lug for inserting therein, and guided by lateral wall of the channel, a spring-like member having centrally a boss which engages the aperture of the conductor end. The spring-like member has opposite ledges for clipping with the front and the rear edge of the base of the lug and channel.

1 Claim, 3 Drawing Sheets

CLIP-CONNECTED TERMINAL CONDUCTOR ASSEMBLY

BACKGROUND OF THE INVENTION

The invention relates in general to conductor terminals, and more particularly to the assembly of a line cable with the bus terminal of a circuit breaker.

As disclosed in U.S. Pat. Nos. 3,891,298 and 4,603,376, a terminal lug, or collar, is used, with a screw applied therethrough to the cable in order to maintain in tight and overlapping relation an electrical cable and the flat conductor end of a circuit breaker. An important problem to solve with such assembly has been to obtain a good counter-force on the base and to counteract any tangential forces developing between the lug or collar base and the conductor end, on the side opposite to the applied screw forces. To this effect, the conductor end is provided with a central aperture and the base of the lug, or collar, has been given a complementary projection, or boss engaging the aperture when mounted. Such mechanical problem has to be solved in a simple manner and without impairing the standard nature of the assembly for different types of circuit breakers, nor the inherent advantage of a straightforward mounting. This has been solved in the '298 patent by using a clip which can be snapped on the sandwich formed by the lug, or collar base, and the conductor end before placing the cable into the lug, or collar, and applying the screw transversely thereto. In the '376 patent the disclosed solution consists in using an additional screw passed through the base of the lug, or collar, and projecting as a post into the aperture of the conductor end once mounted.

SUMMARY OF THE INVENTION

The invention proposes a simple and standard solution for holding the conductor end of a circuit breaker in position upon the base of the terminal lug, or collar, before tightening together with a screw the line cable and the conductor end in overlapping relation therein. It takes advantage of an open channel provided in the collar, or lug. It resides in inserting, in such channel between the conductor end and the inner surface of the base of the lug, or collar, a spring-like member provided with a boss, guided by the lateral walls of the channel, so as to combine the clip function and the conductor end aperture engaging function The inserted member has an overall curvature for resiliency with two opposite ledges for clipping with the front and back edges of the lug, or, collar base, while the central boss engages the aperture of the conductor.

DETAILED DESCRIPTION OF THE INVENTION

While the invention can be used for connecting line or power cables to various controlled devices requiring input and/or output involving a terminal conductor of the device and the power supplying cable, the invention will be described hereinafter in the context of a circuit breaker, as the preferred embodiment thereof.

Figure 1A:
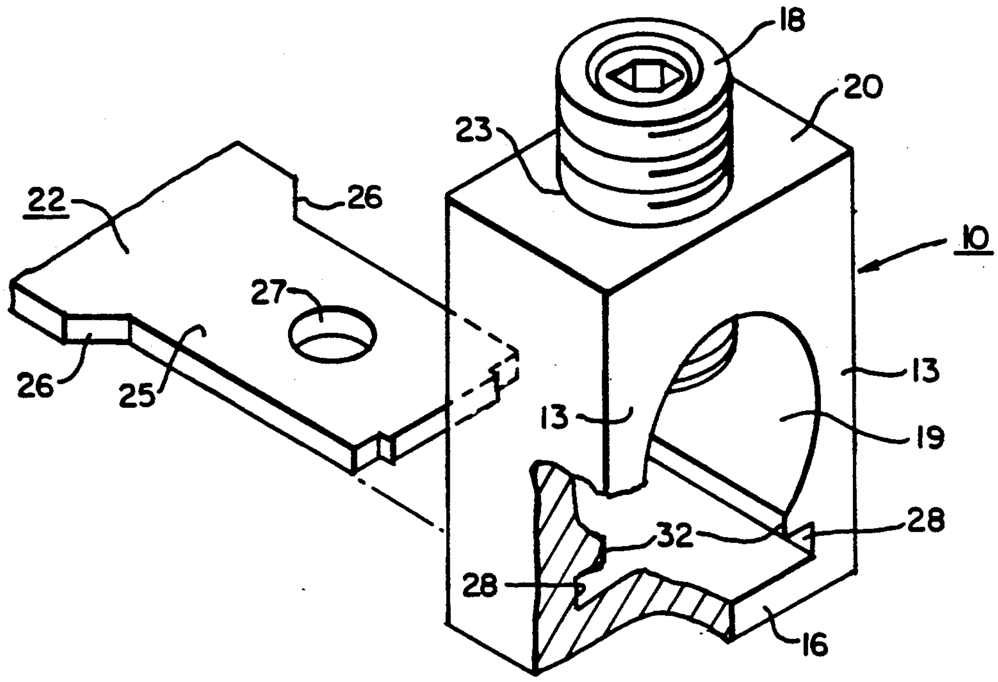
FIG. 1A is an exploded perspective view of a terminal assembly combining a lug, or collar, and a conductor end in the preferred embodiment of the invention.
Figure 1B:
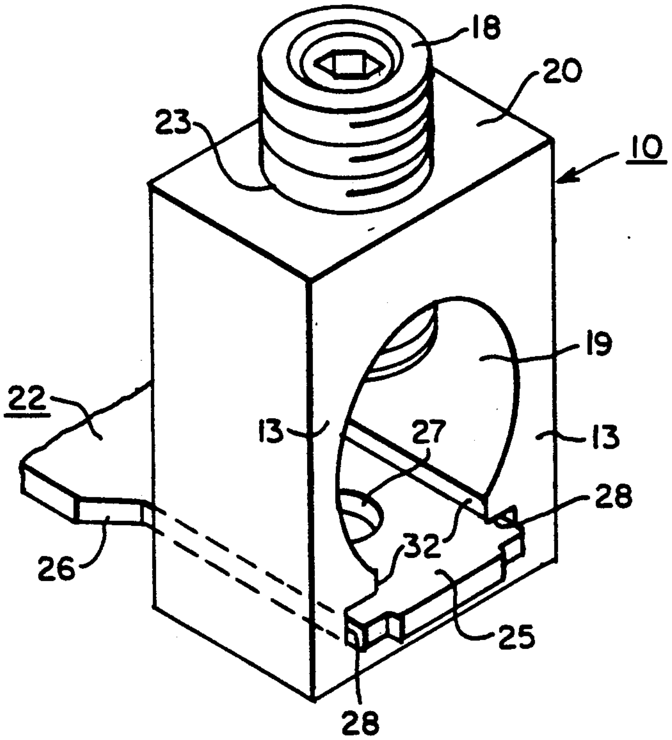
FIG. 1B is like FIG. 1A, but with the conductor end in place within the lug, or collar.

Referring to FIGS. 1A and 1B, a terminal assembly is shown to include a collar or lug, 10 within which a conductor terminal 22 is to be inserted together with a cable (not shown), both to be tightly held in overlapping relation with the help of a locking screw 18 disposed in a threader aperture 23 provided in the top wall 20. The lug, or collar, has a pair of side walls 13 between the top wall 20 and a bottom wall or base 16. It has a generally cylindrical inner surface 19 intended to receive the cable just below the locking screw 18 entering from the top. At the bottom, such inner surface 19 merges, along opposite frontal surfaces 32, into an open channel defined by the upper surface of the base 16 and two opposite parallel grooves each having deep therein a lateral wall 28 bordered by a cornice ending with a corresponding one of the frontal surfaces 32. In FIG. 1A, the conductor terminal is shown external and in perspective, with its cross-section matching the cross-section of the afore-stated open channel. In FIG. 1B the conductor terminal 22 is shown in place within the open channel. The conductor terminal 22, which is flat with a rectangular cross-section, has an end portion 25 which is similar but, due a pair of tapered laterally extending shoulders 26, with smaller transversal dimensions which match the cross-section of the open channel of the collar, or lug 10. Therefore, when inserted the opposite sides of the end portion 25 are substantially aligned with the two walls 28 of the channel grooves, respectively. Moreover, the end portion 25 possesses a central aperture 27. When the conductor terminal has been placed so that the end portion 25 is fully inside the open channel, the aperture 27 should be aligned with the axis of the locking screw 18, which is also the vertical axis of the collar, or lug 10. For the purpose of describing such an arrangement, U.S. Pat. No. 4,603,376 is hereby incorporated by reference. In contrast to the present invention, the terminal assembly according to the '376 patent makes use of an additional screw which is passed through the base of the lug, or collar 10, and advanced far enough therethrough so as to engage the aperture 27 of the end portion 25, thereby to anchor the terminal bus in place. The locking screw 18 does not raise any problem of fastening the lug, or collar 10 to the cable, because of the excellent grip obtained with the locking screw upon the wires of the cable once tightened. However, without such an appropriate solution, within the collar, or lug, the underlapping end portion 25 of conductor terminal 22, because of its flat shape, is likely to slip away along the base 16. Another solution to the problem is found in U.S. Pat. No. 3,891,298. This patent is also incorporated by reference. There, a boss is provided upon the upper surface of the base 16 of the lug, or collar 10, which should engage the aperture 27 of the end portion 25. Still, the two pieces so related should be held together. To this effect, a clip is snapped on the back of the collar base from below, after being hooked from the top over the front of the end portion 25, thereby to hold together in sandwich relation both the end portion 25 of the conductor terminal and the base 16, while the boss is engaged in the aperture 27. Illustratively, on FIGS. 1A and 1B, the end portion 25 is shown having a tip 54 projecting somewhat from the end wall 52, at the farthest end of the terminal conductor 22.

Figure 2:
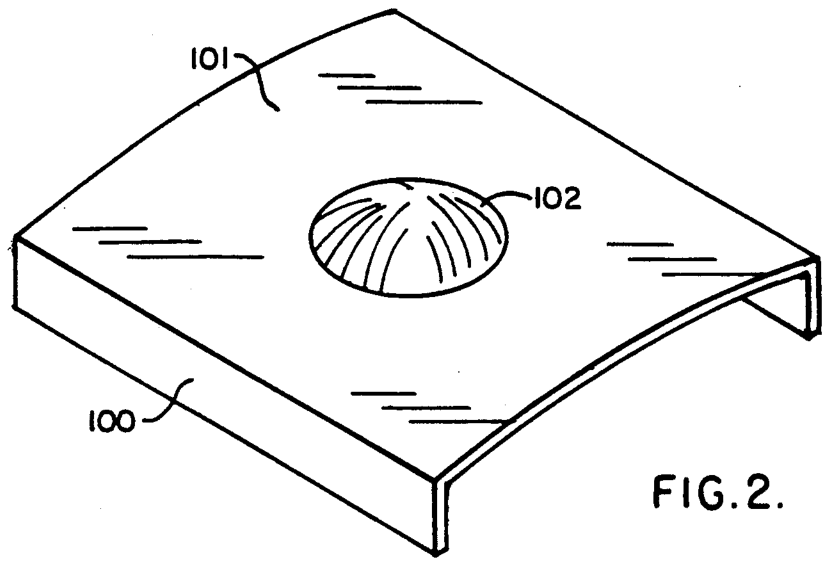
FIG. 2 is an isometrical view of the clip according to the present invention as can be used with the terminal assembly of FIG. 1.
Figure 3:
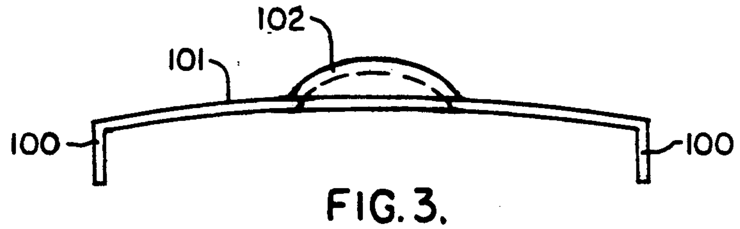
FIG. 3 is a sectional view of the clip of FIG. 2.
Figure 4:
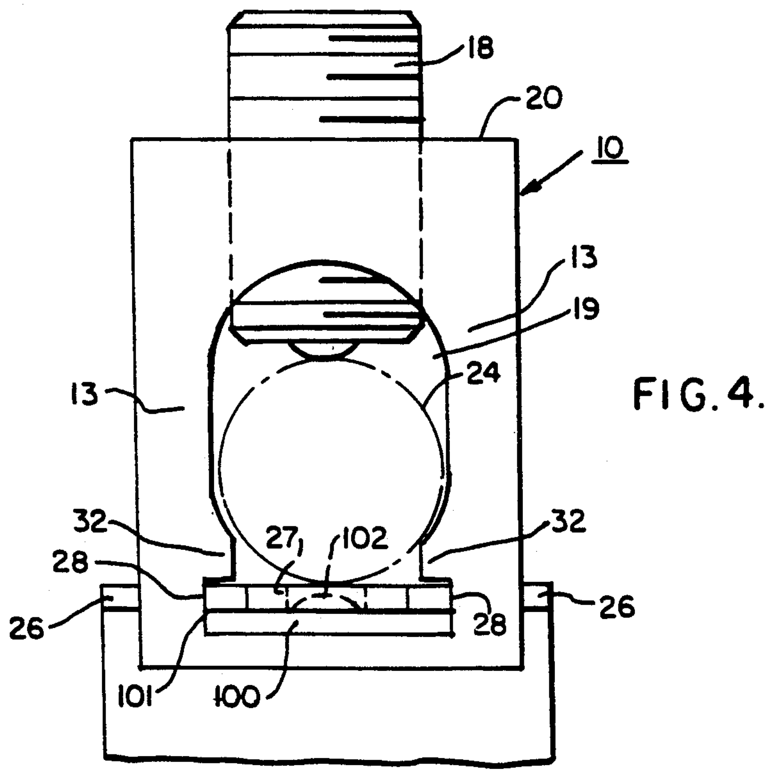
FIG. 4 shows the terminal assembly of FIG. 1 embodying the clip according to FIGS. 2 and 3.

According to the present invention, and as shown in FIGS. 2 and 3, a metallic curved member 101 of thin transversal dimension, exhibiting a substantial resiliency when planar forces are applied thereupon, is provided with ledges 100 at two opposite ends and with a boss centrally disposed. Member 101 has a contour generally rectangular in projection which matches the contour of the upper surface of the base 16 of the lug, or collar 10. The transversely oriented ledges 100 will provide the clip function once they have been snapped over the front and the back edges, respectively, of the base 16. The central boss 102 being sized so as to match the aperture 27 of the end portion, once engaged will serve as the anchor for the end portion 25, provided, under the locking screw 18, the spring effect of member 101 applies the boss 102 into the aperture 27 with sufficient forces. The curvature of the member is shown in FIG. 3 which is an overall cross-section by the middle of the boss 102 of member 101. The member is defined by two opposite surfaces having a common generatrix line which, when installed, becomes parallel to the back and the front edge of the collar, or lug, base 16. The length of such generatrix matches the distance between the two end walls 28 of the grooves of the open channel which receives the conductor end portion 25. Thus, the two free edges of member 101 will be adjoining the end walls 28, thereby aligning the member in the open channel when positioned therein. Accordingly, the three functions which were separately provided in the prior art are now supplied altogether by member 101, namely the clip, the centering and the spring functions. As a result, the base of the collar, or lug 10, can be made simple and of selected standard design. All that is required with such standard collar, or lug, is a simple, low cost and effective member such as shown at 101 in FIGS. 2 and 3. FIG. 4 shows the assembly according to the invention with the front ledge 100 of member 101 appearing before the front surface of the collar, or lug 10. The screw is shown inserted and applied to the cable 24 shown in dotted line.

Figure 5:
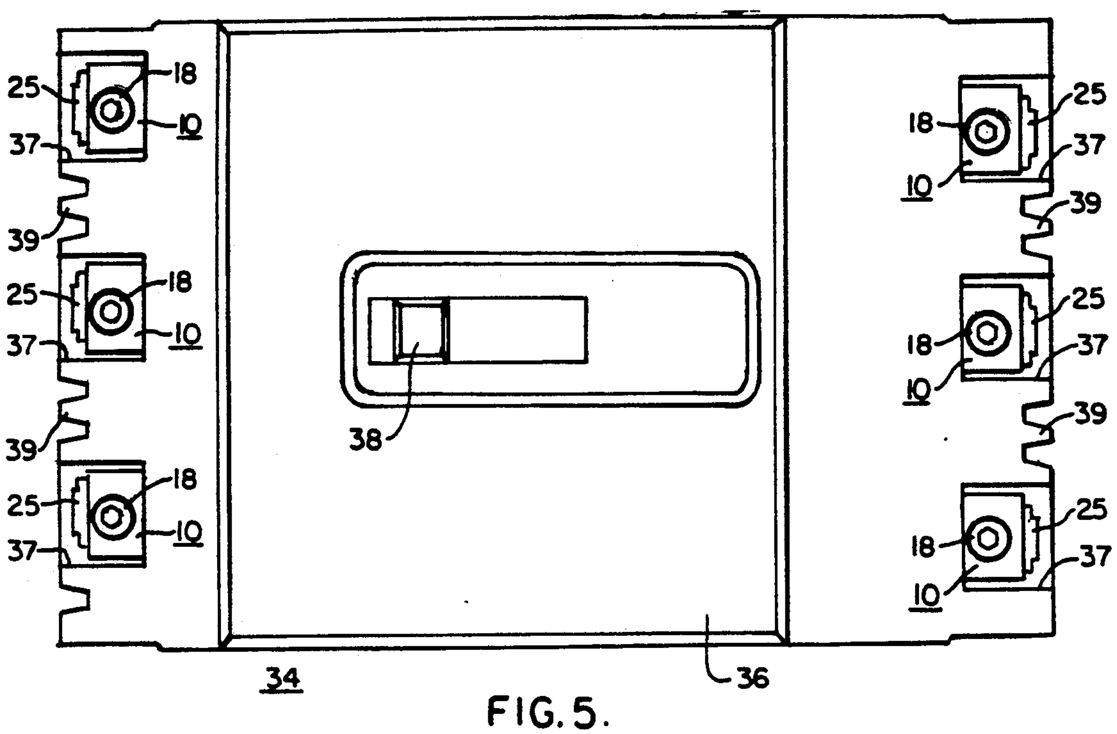
FIG. 5 is a front view of a molded-case type circuit breaker showing laterally of the housing a series of recesses containing respective terminal assemblies such as the one shown in FIG. 1.
Figure 6:
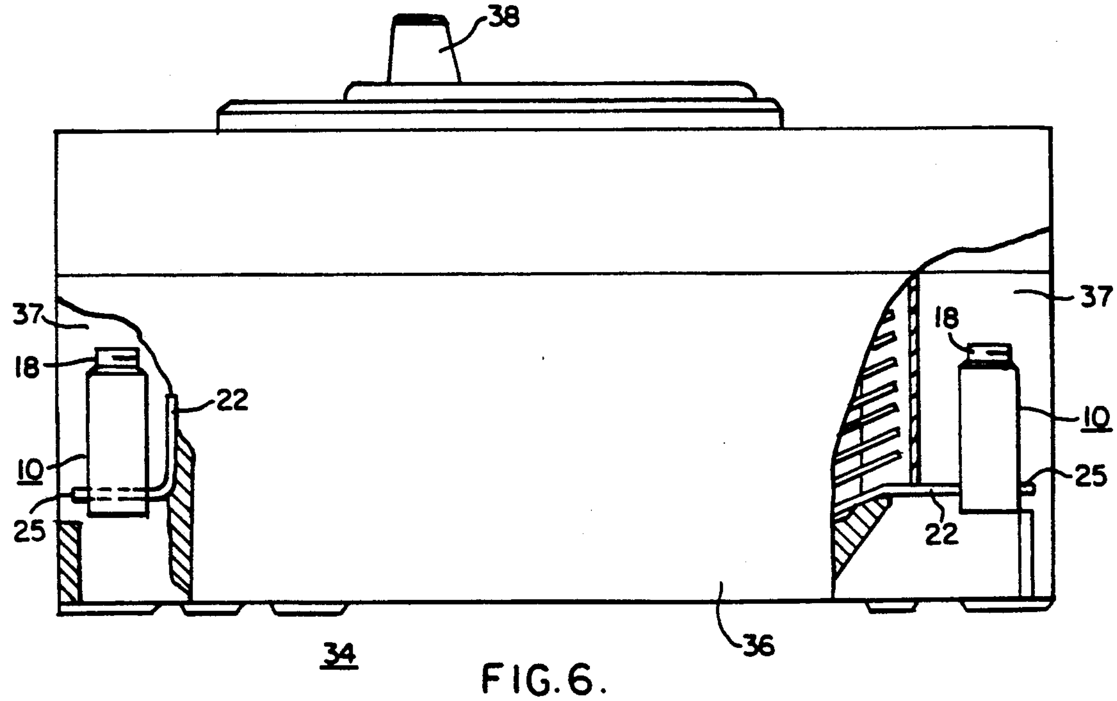
FIG. 6 is a side view of the circuit breaker of FIG. 5 with its housing.

FIGS. 5 and 6 are like those of the incorporated U.S. Pat. No. 4,603,376. The housing of a three-pole circuit breaker 34 is shown with three pairs of bus conductors (between load and power line) connected each with an assembly according to the present invention. As shown in FIGS. 5, 6, each conductor terminal 22 extends from the circuit breaker housing 36, and is located with one of several small cavities or recessed 37 separated from each other by insulating baffles 39. The circuit breaker 34 is manually operated with

We claim:

1. A terminal assembly for connecting an electric cable to a bus conductor having a flat and square end portion with a central recess therein comprising:

a collar having an inner wall defining, between a head and a base portion thereof, a substantially central opening for accommodating therethrough the cable and the conductor end portion side-by-side in overlapping relation;

said central opening having a first section adjoining said head portion for receiving the cable and a second section adjoining said base portion for receiving the conductor end portion;

said second section forming an open channel communicating with said first section and of rectangular cross section matching the cross section of the conductor end portion; said open channel being defined by opposite lateral walls and by the inner surface of said, collar base portion joining said lateral walls, whereby the conductor end portion is lodged into said open channel for slip-fitting therein;

said collar head portion having a transversal threaded aperture with a locking screw extending therethrough for applying a perpendicular tightening force on the cable; and clip means being provided including a resiliently curved metallic member symmetrically defined by parallel generatrices extending between opposite side edges from a front end to a back end of the member; said opposite edges being distant by substantially the distance between said lateral walls so that said member side edges are guided by said lateral walls of said collar open channel;

a boss being provided centrally on said member, projecting on the convex side thereof and matching the end portion recess;

said member extending from front end to back end sufficiently, when lodged inside said second section, to ride upon said collar base inner surface, and said member having ledges along said front and back edges for gripping the respective front and back sides of said collar base portion;

said member being placed within said open channel (a) upon said collar base inner surface for clipping thereupon and (b) below the conductor end portion for boss and recess mating under resilient cooperative pressure by said locking screw and said member.

* * * * *